Sept. 28, 1926.

A. S. LOVE

POULTRY FEEDER

Filed July 1, 1925

1,601,030

Inventor
A. S. Love
By C. A. Snow & Co.
Attorneys.

Patented Sept. 28, 1926.

1,601,030

UNITED STATES PATENT OFFICE.

ANDREW S. LOVE, OF MONTOUR COUNTY, PENNSYLVANIA.

POULTRY FEEDER.

Application filed July 1, 1925. Serial No. 40,838.

This invention relates to a poultry feeder, one of the objects being to provide a simple and compact structure having a trough to which feed is supplied from a magazine, there being simple and efficient means within the magazine and extending into the trough whereby, when said means is uncovered by the consumption of feed in the trough, it will, when shifted out of its position cause a new supply of feed to be delivered to the trough.

A further object is to provide a feeder in which the feed controlling members are removably mounted and can be arranged in desired numbers so as to insure the delivery of the proper amount of feed to the trough.

A still further object is to provide delivery members which will be shifted by the poultry while feeding but only when the feed within the trough has been almost completely consumed.

With the foregoing and other objects in view which will appear as the description proceeds, the invention resides in the combination and arrangement of parts and in the details of construction, hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
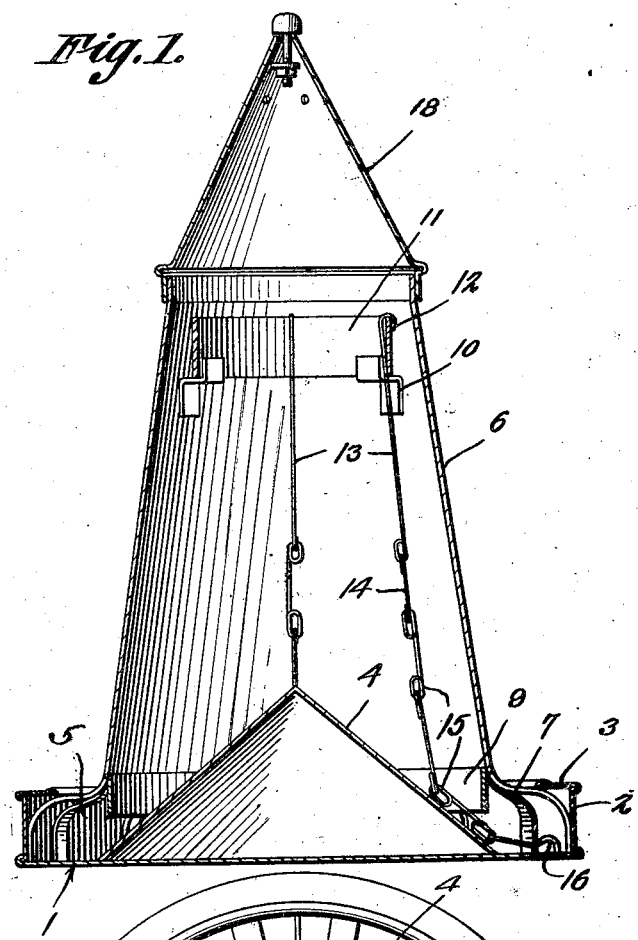
Figure 1 is a central vertical section through the feeder.
Figure 2:
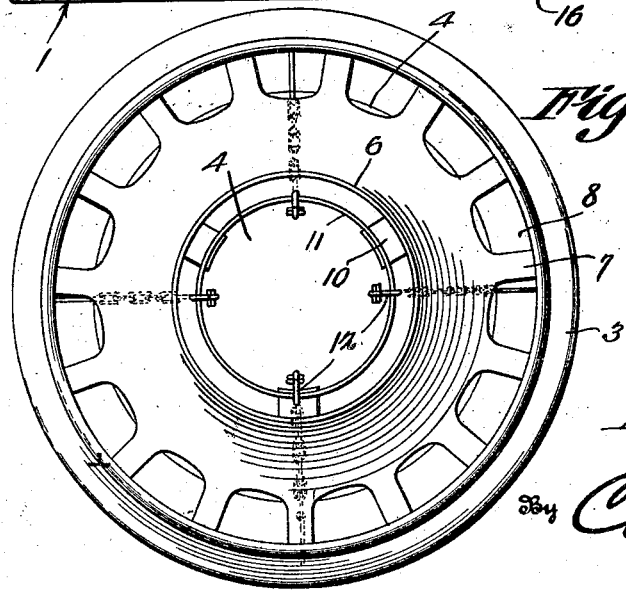
Figure 2 is a top plan view, the cover being removed.

Referring to the figures by characters of reference 1 designates the base of the feeder, the same being preferably circular and provided with an upstanding peripheral wall 2 having an inwardly extending continuous flange 3. A conical spreader 4 is fixed upon the base 1 and arranged concentrically, this spreader cooperating with the wall 2 to provide an annular trough 5.

A magazine 6 which can be tapered upwardly as shown, is arranged concentric with the spreader 4 and has its lower edge spaced inwardly from the flange 3. Extending from this lower edge are supporting fingers 7 which are curved laterally and downwardly and bear against the flange 3 and on the base 1. These fingers are preferably produced by cutting away the material at the lower end of the magazine 6 so as to form openings 8 through which the poultry can reach the contents of the trough 5. A ring 9 is secured to the inner surface of the magazine 6 close to the lower end thereof and has its lower edge supported adjacent to but spaced from the spreader 4. Thus an annular outlet is provided between the ring 9 and the spreader through which feed can flow into the trough.

Figure 3:
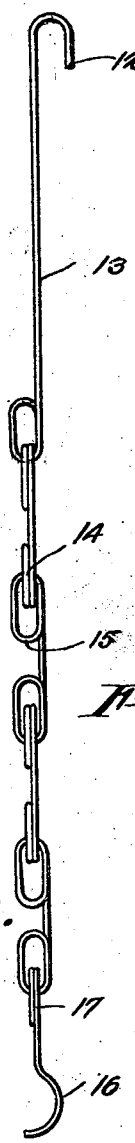
Figure 3 is an enlarged elevation of one of the controlling chains.

Brackets 10 are arranged within the upper portion of the magazine and support a ring 11. This ring is engaged by hooks 12 provided at the upper ends of rods 13. The lower ends of these rods are connected to the upper links of chains 14, the chains being sufficiently long to rest upon the base portion of the spreader 4 and to extend freely into the trough 5. Each link of each chain, except the link at the free end, is formed of a length of wire forming, at its ends elongated eyes 15. The eyes of each link extend through the eyes of the next adjoining links and these links are sufficiently large to receive portions of the feed. The link at the free end of each chain has an elongated eye at one end while the other end is preferably bent to form a hook 16. This hook is preferably disposed in a plane at right angles to the plane of the eye 17 at the other end of the link. This is clearly shown in Figures 1 and 3.

Any desired number of chains can be mounted within the magazine and when they are in position the links at the lower ends thereof will lie within the trough 5. When feed is placed in the magazine 6 a portion thereof will be deflected by the spreader 4 so as to flow under the ring 9 and into the trough 5 thereby covering the lower end links of the chains. The remainder of the feed will pack within the magazine 6 and about the chains 14 and the rods 13. The poultry will remove the feed through the openings 8 and after most of the feed has been consumed the end links will become exposed. In searching for additional food a chick will hit the link of the chain with its bill and deflect it laterally. This will result in the entire chain being agitated. Consequently that portion of the feed within the magazine 6 which is packed around the chain and its rod will be loosened and will flow downwardly along the chain into the trough. The poultry will soon learn to strike the chain links when the supply of feed is low and in this way the device becomes a self feeder.

When the feeder is used for small chicks a greater number of chains are employed than where larger poultry feed from the device. As the chains are detachable they can be readily removed from the magazine as the chicks increase in size. Ultimately, when the chicks have reached full growth, one or two of the chains are all that are necessary.

Importance is attached to the fact that each chain is extended from a rod 13. Thus when any part of the chain is agitated by the shifting of the lower link within the trough 5, the motion is transmitted to the rod and this rod will move throughout its length. As a result of this action the feed becomes agitated practically throughout the depth thereof so that it will flow properly along the rod and chain into the trough.

The magazine can be provided with a suitable cover 18 for protecting its contents.

It is to be understood that if desired the chains can be entirely removed. This is particularly true where large poultry are being fed. Because of their strength they are able to agitate the feeder sufficiently to insure proper gravitation of the feed. Where young and smaller poultry are being fed, however, the chains are desirable.

In operation the chains when agitated can work entirely around the feeder because their movement is in no way obstructed by the supporting ring.

What is claimed is:

A poultry feeder including a magazine, a spreader extending upwardly thereinto, a trough surrounding the spreader, means within the trough for supporting the magazine, said means being spaced to give access to the contents of the trough, a ring supported within the magazine, rods detachably mounted on and depending from the ring, chains depending from the rods and bearing loosely at their free end portions upon the spreader and within the trough, each of said chains having end links provided with a loop at one end and a hook at the other end, said hook disposed in a plane perpendicular to the plane of the loop.

In testimony that I claim the foregoing as my own, I have hereto affixed my signature.

ANDREW S. LOVE.